UNITED STATES PATENT OFFICE 1,998,546

ACID DYESTUFF OF THE ANTHRAQUINONE SERIES AND PROCESS OF PREPARING IT

Georg Kränzlein and Ernst Diefenbach, Frankfort-on-the-Main-Hochst, Germany, assignors to General Aniline Works, Inc., New York, N. Y., a corporation of Delaware No Drawing. Application October 20, 1933, Serial No. 694,518. In Germany February 6, 1930

4 Claims. (Cl. 260—60)

The present invention relates to new acid dyestuffs of the anthraquinone series and a process of preparing them, more particularly it relates to blue acid dyestuffs of the general formula:

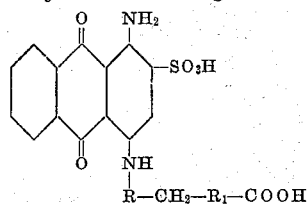

wherein R and $R_1$ represent radicals of the benzene series and the COOH group in the radical $R_1$ occupies the ortho-position to the $CH_2$-group. The benzene radicals R and $R_1$ may contain substituents, such as alkyl, OH, O-alkyl, halogen, COOH.

Our new dyestuffs which dye wool and silk blue tints of good fastness properties are obtainable with a good yield by condensing a 1-amino-4-halogen-anthraquinone-2-sulfonic acid of the formula:

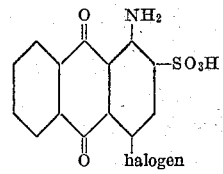

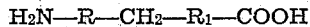

or a salt thereof, with a compound of the formula:

$$H_2N-R-CH_2-R_1-COOH$$

wherein R and $R_1$ represent radicals of the benzene series and the COOH-group in the radical $R_1$ occupies the ortho-position to the $CH_2$-group, or a salt thereof, by heating the components in the presence of an acid binding agent and a small quantity of a copper compound.

The new compounds may be used as dyestuffs or as starting materials for the manufacture of other dyestuffs.

The same blue acid dyestuffs are obtainable by condensing a Bz'-aminodiphenylmethane-2-carboxylic acid with a 1-amino-2.4-dihalogen-anthraquinone and substituting in the 1-amino-2-halogen-4-arylidoanthraquinones thus obtained the sulfonic acid group for the halogen atom standing in 2-position of the anthraquinone compound, advantageously by treatment with alkali metal sulfites.

We have furthermore found that the blue acid dyestuffs, obtainable as above described, may be converted into new dyestuffs having entirely different properties, by treating them with concentrated sulfuric acid or a similar agent such as chlorosulfonic acid. The conversion even occurs under very mild conditions of reaction, especially at low temperatures. The blue dyestuffs used as starting materials chiefly yield brown to gray to green dyestuffs. The constitution of the new products has not yet been definitely ascertained, but most probably ring closure occurs by the dehydrating action of the sulfuric acid.

This application is a continuation-in-part application to our copending application Serial No. 512,490 filed January 30, 1931.

The following examples serve to illustrate the invention, but they are not intended to limit it thereto, the parts being by weight:

(1) 40 parts of sodium 1-amino-4-bromo-anthraquinone-2-sulfonate are dissolved in 350 parts of water. After addition of 27,5 parts of sodium salt of 3-amino-diphenylmethane-2'-carboxylic acid, 20 parts of sodium bicarbonate and 1.6 parts of cuprous chloride, the mixture is heated, while stirring, at 60° C. to 70° C. until the formation of the dyestuff is finished. The dyestuff, thus formed, which corresponds with the following formula:

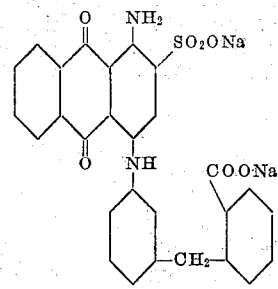

is precipitated by addition of hydrochloric acid and purified by dissolving it in dilute sodium carbonate solution and re-precipitating it. 10 parts of the blue crystalline dyestuff powder, thus obtained, are introduced, while stirring, into 100 parts of chlorosulfonic acid, the temperature not being allowed to rise above +20° C. The reaction is finished when a test portion taken from the reaction mixture dissolves in concentrated sulfuric acid to a blue solution. After the melt has been introduced into ice water, the dyestuff which has been precipitated, is filtered by suction, washed and dried. It forms a dark crystalline powder which dissolves in water to a greyish-blue solution and dyes wool and silk beautiful bluish-grey tints of very good fastness.

(2) 32 parts of 3'-amino-4'-ethoxy-diphenylmethane-2-carboxylic acid are dissolved in 400 parts of water and 7 parts of sodium carbonate. After addition of 40 parts of sodium 1-amino-4-bromoanthraquinone-2-sulfonate, 20 parts of sodium bicarbonate and 2 parts of cuprous chloride, the mixture is heated, while stirring, at 60° C. to 70° C. until the formation of the dyestuff is finished. The condensation product is purified in the usual manner by precipitating it by means of acid, dissolving it in sodium carbonate solution and re-precipitating it. There is obtained a dark crystalline powder which dyes wool and silk greenish-blue tints. The dyestuff has the following constitution:

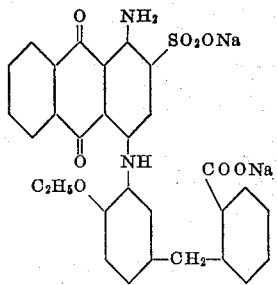

10 parts of the product, thus obtained, are gradually introduced while stirring, into 100 parts of chlorosulfonic acid which has been cooled to +5° C. After stirring for one hour, during which time the temperature is not allowed to rise above +25° C., the melt is decomposed by mixing it with ice and the dyestuff, thus precipitated, is filtered by suction, washed and dried. There is obtained a dark crystalline powder which dyes wool and silk green tints of very good fastness to washing and to fulling.

(3) 50 parts of sodium salt of 2'-amino-4'-methyldiphenylmethane-2-carboxylic acid are dissolved in 500 parts of water. After addition of 53 parts of sodium 1-amino-4-bromo-anthraquinone-2-sulfonate, 25 parts of sodium bicarbonate and 2,5 parts of cuprous chloride, the mixture is heated, while stirring, at 60° C. to 65° C. until the formation of the dyestuff is finished. The reaction product is then isolated and purified in the usual manner and there is obtained a blue dyestuff powder which dyes the animal fiber clear blue tints. The dyestuff has the following constitution:

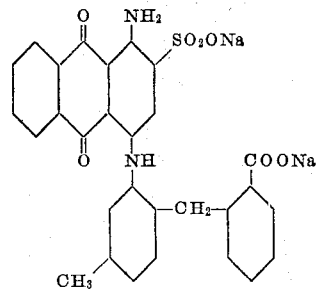

5 parts of the product are introduced at room temperature into 50 parts of concentrated sulfuric acid, while stirring, and the temperature is maintained at +25° C. to 30° C. for three hours. The mixture is then poured into ice water, the dyestuff which has been precipitated in the form of brown flakes, is filtered by suction, washed and dried. The red-brown powder, thus obtained, dissolves in water to a reddish-brown solution and dyes wool and silk brown tints of good fastness.

We claim:
1. The acid dyestuffs, substantially identical with those which are obtainable by causing a compound of the formula:

wherein Z stands for OH or Cl, to act upon a compound of the following general formula:

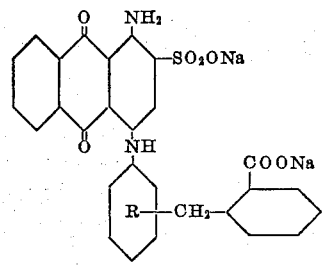

wherein the nucleus R may contain a —OC₂H₅ or a CH₃ group as substituent, and the bond from the CH₂ group to R is either in ortho or meta position to the NH group under mild conditions of reaction, particularly with regard to the reaction temperature.

2. The acid dyestuffs substantially identical with those which are obtainable by causing chlorosulfonic acid to act at a temperature not exceeding about +25° C. upon a compound of the following general formula:

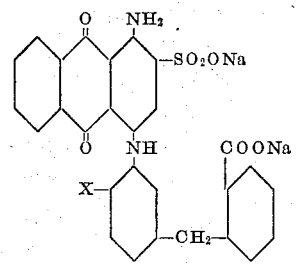

wherein X represents hydrogen or a —OC₂H₅ group.

3. The acid dyestuff, substantially identical with that which is obtainable by causing chlorosulfonic acid to act at a temperature not exceeding about +20° C. upon a compound of the formula:

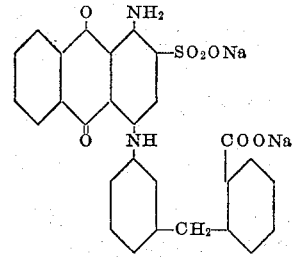

forming a dark crystalline powder which dissolves in water to a greyish-blue solution and dyeing wool and silk beautiful bluish-grey tints of very good fastness.

4. The acid dyestuff, substantially identical with that which is obtainable by causing chlorosulfonic acid to act at a temperature not exceeding about +25° C. upon a compound of the formula:

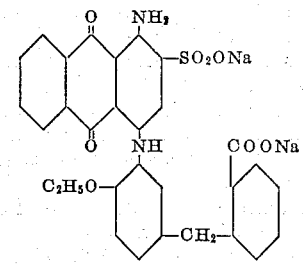

forming a dark crystalline powder and dyeing wool and silk green tints of very good fastness to washing and to fulling.

GEORG KRÄNZLEIN.
ERNST DIEFENBACH.